United States Patent
Roseberry

(10) Patent No.: US 8,776,780 B2
(45) Date of Patent: Jul. 15, 2014

(54) ATTIC VENTILATION AND HEAT RECOVERY DEVICE FOR WARMING SWIMMING POOLS

(76) Inventor: Christopher Roseberry, Garland, TX (US)

(*) Notice: Subject to any disclaimer, the term of this patent is extended or adjusted under 35 U.S.C. 154(b) by 1539 days.

(21) Appl. No.: 12/249,745

(22) Filed: Oct. 10, 2008

(65) Prior Publication Data

US 2010/0089387 A1    Apr. 15, 2010

(51) Int. Cl.
*F25B 29/00* (2006.01)
*F24D 5/04* (2006.01)

(52) U.S. Cl.
USPC ........... 126/563; 126/270; 126/271; 126/428; 126/435; 165/108; 165/58; 454/365; 454/366

(58) Field of Classification Search
USPC ......... 126/563, 427, 428, 429, 416; 165/48.1, 165/201; 454/365, 366
See application file for complete search history.

(56) References Cited

U.S. PATENT DOCUMENTS

| | | | |
|---|---|---|---|
| 629,122 A | 7/1899 | Davis | |
| 1,338,644 A | 4/1920 | Arthur et al. | |
| 2,579,662 A * | 12/1951 | Gibson | 454/365 |
| 3,599,626 A | 8/1971 | Bouse | |
| 3,902,474 A | 9/1975 | Pyle et al. | |
| 3,989,032 A | 11/1976 | Harrison | |
| 4,011,904 A | 3/1977 | Hope et al. | |
| 4,049,046 A * | 9/1977 | Worthington | 165/48.2 |
| 4,051,999 A | 10/1977 | Granger et al. | |
| 4,082,080 A | 4/1978 | Pittinger | |
| 4,086,911 A | 5/1978 | Futch | |
| 4,133,338 A | 1/1979 | Honikman | |
| 4,227,515 A * | 10/1980 | Jacob et al. | 126/592 |
| 4,241,725 A | 12/1980 | Emon et al. | |
| 4,242,872 A | 1/1981 | Shaw | |
| 4,254,822 A | 3/1981 | Geier | |
| 4,265,221 A * | 5/1981 | Whinnery | 126/591 |
| 4,270,518 A | 6/1981 | Bourne | |
| 4,353,412 A | 10/1982 | Krumhansl | |

(Continued)

FOREIGN PATENT DOCUMENTS

JP    61-107050 A    5/1986

OTHER PUBLICATIONS

Chuck Marken & Doug Puffer; Under Control Solar Water Heating; home power 126/ Aug. & Sep. 2008; pp. 58-61.

*Primary Examiner* — Steven B McAllister
*Assistant Examiner* — Nikhil Mashruwala
(74) *Attorney, Agent, or Firm* — Shannon W. Bates; Klemchuk Kubasta LLP

(57) ABSTRACT

A machine that improves the management of thermal energy for a residence or other building by serving as both a swimming pool 26 water heater and an attic space 22 ventilator. The heating of air within an attic space 22, resulting primarily from the insolation of the roof surface 24, is exploited to heat water 26. The device consists of an air-to-water heat exchanger coil 28, a fan 30, an air outlet passage 32 between the attic 22 and the outside air with the necessary mounting 90 and weather excluding structure 86. When water heating is not required, the device retains its attic ventilation function in order to reduce the cooling load on the air refrigeration system for the building. The device may be used as either an alternative to a fuel burning or electric powered water heater or as a means to minimize the use and expense of such heaters.

23 Claims, 15 Drawing Sheets

(56) References Cited

U.S. PATENT DOCUMENTS

| | | | |
|---|---|---|---|
| 4,368,549 A | 1/1983 | Ramey | |
| 4,378,785 A | 4/1983 | Fleischman et al. | |
| 4,378,787 A | 4/1983 | Fleischman | |
| 4,406,278 A | 9/1983 | Demmer | |
| 4,418,685 A * | 12/1983 | Frazier | 126/628 |
| 4,470,271 A | 9/1984 | Draper et al. | |
| 4,470,404 A | 9/1984 | Kremen | |
| 4,479,487 A | 10/1984 | Migdal | |
| 4,502,467 A | 3/1985 | Smith | |
| 4,517,958 A | 5/1985 | Worf | |
| 4,621,613 A | 11/1986 | Krumhansl | |
| 4,671,253 A | 6/1987 | Blount, Sr. | |
| 4,733,417 A | 3/1988 | De Shon | |
| 5,014,770 A * | 5/1991 | Palmer | 165/48.2 |
| 5,452,710 A | 9/1995 | Palmer | |
| 5,632,677 A | 5/1997 | Elkins | |
| 5,975,192 A * | 11/1999 | Moratalla et al. | 165/45 |
| 6,126,540 A | 10/2000 | Janu et al. | |
| 2005/0072082 A1* | 4/2005 | Sigmund et al. | 52/302.1 |
| 2008/0060787 A1* | 3/2008 | Bobel | 165/58 |
| 2010/0154109 A1* | 6/2010 | Roseberry | 4/493 |

* cited by examiner

ATTIC VENTILATION AND HEAT RECOVERY DEVICE FOR WARMING SWIMMING POOLS

The present disclosure relates generally to both attic ventilation machines and water heating devices, and specifically to a machine that can perform both water heating and attic ventilation.

BACKGROUND

The warming of swimming pools is one of the most practical and successful applications of solar energy. For this use of solar energy, the often intermittent presence of direct sunlight does not create difficulties or inconvenience because swimming pools are sizable thermal reservoirs. One or two days of cloudy weather does not usually cause the pool temperature to become uncomfortable. The main obstacle to a more widespread adoption of solar pool heating is the initial cost of the equipment. The primary factor determining the expense involved with most solar heating and power systems is that they require a large amount of material in order to present a large surface area for insolation (exposure to sunlight).

A typical solar panel consists of water passages bonded to a sunlight absorption surface that is covered by transparent glazing. The technology is not complicated but it usually requires a lot of copper and glass. A disadvantage of glazed solar collectors is that they may be heavily damaged by hail storms. More rugged, hail resistant, solar panels can be made, but at greater expensive.

For swimming pool applications, solar panels without glazing are very common. These collectors consist only of flexible black plastic or rubber panels with internal water passages. This less expensive kind of solar collector will have somewhat lower performance than a glazed collector particularly during windy weather or when the ambient air is cold. Plastic and rubber are generally not durable when exposed to sunlight especially when compared to a metal surface. The sizing rule of thumb commonly used by solar panel vendors recommends a collector panel area of 50 to 120% of the swimming pool free surface area. Purchasing enough plastic panels to meet this criterion for a moderately sized pool costs at least several hundred to a thousand dollars. For a 600 ft$^2$ pool surface, buying 50% of this area in solar panels costs $1200, and purchasing 120% of the pool area would cost $2830 according to a current swimming pool supply catalog. A fixed solar panel (without a sun tracking mechanism) has to be oriented properly to maximize the amount of insolation it receives. Accordingly, such a panel may be at peak effectiveness during only a few hours of a day. Moreover, in some cases there may not be a suitable expanse of roof surface in the proper orientation for which to mount a solar collector. Another disadvantage of roof-mounted solar panels is the necessity of taking them down and then reinstalling them whenever the roof shingles are replaced. Roof-mounted panels will remove some of the load on a house's cooling system by keeping portions of the roof surface from getting hot. However, in most cases solar panels will only cover a small fraction of a roof surface.

Another technique for warming a swimming pool is to use a translucent plastic pool surface cover with encapsulated air pockets. Such solar blankets or "bubble wrap" covers help reduce evaporation and increase solar gain, but they are inconvenient to stow when the pool is to be used. Pool cover reels can make stowage much easier, but these reels typically cost hundreds of dollars. Some swimming pools have irregular shapes which make a pool cover and reel particularly impractical. Furthermore, the bubble covers tend to degrade from sunlight exposure. In addition, a pool cover cannot contribute heat while people are swimming in the pool. Accordingly, frequent swimming during the afternoon hours could significantly detract from the benefits of a pool cover.

Fuel-burning pool heaters are still the most common type of pool heater in use. Fuel-burning heaters tend to have a much greater heat output rate than solar systems. For example, natural gas pool heaters typically have heating outputs in the range of 100,000 to 400,000 BTU/hr. To put this quantity in better perspective, a 50-gallon domestic water heater produces about 40,000 BTU/hr and the typical output of a residential furnace is about 50,000 BTU/hr. Accordingly, such combustion pool heaters are often capable of raising the temperature of the pool water 5.6 to 11° C. (10 to 20° F.) within the course of a day. However, the cost associated with such a rapid warm-up makes this practice seem extravagant. Moreover, due to the finite supply, fossil fuels will become increasingly scarce and expensive. Hydrocarbon-burning heaters release carbon dioxide into the atmosphere contributing to harmful global climate change. Unlike roof-mounted solar collectors, fuel-burning heaters do not remove any of the load on a house's cooling system. Another shortcoming of natural gas swimming pool heaters is how quickly they rust and corrode. This can be attributed to fact that the chemical processes of corrosion and rusting will be accelerated with an increase in temperature. The metal parts within a combustion pool heater are exposed to a much higher level of temperatures than what is encountered by an ordinary flat plate solar collector. Combustion heaters must have safeguard devices such as flame detectors and fusible links in order to prevent the hazards of fire, explosion or incomplete combustion. Such failsafe devices are commonplace for fuel-burning appliances but the necessary additional parts add to the expense and service requirements of a heater.

In addition to preventing an attic from accumulating excess moisture, attic ventilation fans are highly effective in reducing the temperature within an attic space. By exhausting hot air and bringing in fresh air, an attic ventilation fan removes some of the overall cooling load on the house by substantially reducing the temperature difference that drives the heat transfer between the attic and the living space. Heat is not only conducted from the attic to the living space below through the ceiling partition, but also through the walls of the air conditioning ducts within the attic. Air conditioning ducts generally have a much thinner layer of insulation (R value range of 2 to 4) than the layer over the ceiling (R value range of 11 to 38). For the cool air supply ducts, the temperature difference between the attic air and the air within the duct is 8.3 to 11.1° C. (15-20° F.) larger than the temperature difference between the attic and living space. Even a well-insulated attic often has gaps or breaks in the insulation layer which would allow a significant amount of heat to 'leak' through to the living space. For example, a 2-ft ft by 4-ft non-insulated attic access door would allow 472 W (1613 BTU/hr) of heating to transfer to the living space from a 140° F. attic. If ventilation was used to bring the attic temperature down to 100° F., then this would reduce the heat transfer rate to 173 W (589 BTU/hr.). Another benefit of attic ventilation is increased service life for asphalt shingles due to the decrease in temperature to which they are exposed. In addition, the discomfort and hazard of working in an attic during the warm part of the year is considerably reduced. Keeping the attic space from reaching high temperatures also allows items to be stored in the attic that would otherwise be damaged by the higher temperatures encountered within an unventilated attic. However, the substantial quantity of heat carried away by an attic ventilation system is discarded rather than utilized.

An example of early effort to exploit attic heat accumulation for warming a swimming pool is R. David Burns' installation of finned copper tubes inside his attic for the purpose of circulating pool water through them. However, the success of this approach was severely limited due to an insufficient rate of convective heat transfer because no means of forced air movement was provided. The convective heat flux (heat transfer rate per unit area) is equal to the temperature difference between a surface and the fluid surrounding it times the convection coefficient. For air movement due only to thermally-induced buoyancy effects (free convection), the convection heat transfer coefficient (or film coefficient) falls in the range of 5 to 25 W/(m²·K). For forced convection where the air is propelled to move, the convection heat transfer coefficient will range between 25 and 250 W/(m²·K). Accordingly, the rate of convective heat transfer is strongly influenced by the velocity of the fluid (gas or liquid) wetting a heat exchanger surface. In addition to the influence of fluid velocity, effective heat transfer between a liquid and a gas requires much more surface area on the gas side of the heat exchanger. Edward G. Palmer introduced an attic-mounted compact air-to-water heat exchanger with forced convection provided by a fan placed at the face of the heat exchanger. The implementation of forced convection raised the heat transfer rate by a factor of 4 to 5 as compared to the Burns installation and also reduced the amount of heat exchanger material required. This development by Edward G. Palmer was patented and commercially developed as the SolarAttic brand model PCS1 and the later model PCS2.

The SolarAttic unit introduces water plumbing into the attic space generally as a retrofit. Such an installation can be done successfully, but great care must be taken to prevent and contain water leaks that would cause substantial damage to the house below. The SolarAttic product does include features such as a water-tight pan and a float sensor to minimize the risk of a leak, but these features inevitably add to the cost of the product. Additionally, since the plumbing is routed through unconditioned space in the attic, measures must be taken to prevent a freeze-induced rupture of the heat exchanger and its plumbing. The prospect of a damaging leak may be much more of a serious issue as a perceived risk by potential consumers rather than an actual risk. Potential customers may be particularly intimidated by SolarAttic's practice of sending the entire flow from a pool pump (up to 3.47 liters per second or 55 gallons per minute) to an attic-mounted heat exchanger. Moreover, the necessary skill to achieve a leak-free installation on the first attempt would tend to exclude most consumers from being able to save money by installing the SolarAttic product themselves rather than hiring a professional. The chances of a damaging leak would depend more on the skill and care undertaken by the installer rather than the degree of manufacturing quality of the attic-mounted unit. If an attic space is fairly confined, it may be difficult or impossible to install and/or maintain the SolarAttic product. If a roof design does not include gables, then it can be difficult to run water lines into the tight space at the juncture where the roof and ceiling framework meet. In many houses, there are wooden structural members at this crowded juncture that would tend to obstruct water lines installed in straight path from the eaves to the attic interior. For warm climates such as the Southern United States, no heating of the swimming pool water is required during much of the summer; however the attic space temperature would still need to be minimized to reduce the cooling load on the house. In other words, there will be times that pool heating is not needed, but attic ventilation is needed more than at any other time of the year. In this situation, the SolarAttic product can not reduce the cooling load on the house without overheating the swimming pool. Accordingly, some form of attic ventilation equipment is required in addition to the SolarAttic installation. Furthermore, this ventilation equipment should be disabled and closed-off for the SolarAttic unit to function properly. The SolarAttic PSC2 sells for over $3000 making it more expensive than most fuel-burning heaters and solar heating systems. Moreover, a temporary installation for sales demonstration purposes is highly impractical. Accordingly, a buyer of the SolarAttic product would not have the opportunity to test its effectiveness at his or her home before making the purchase. The heat output of the SolarAttic product will depend on the particular characteristics of a house and the conditions it is exposed to.

There is a need for improved systems for heating swimming pools and ventilating attics.

SUMMARY

Embodiments of the present disclosure generally provide improved systems for heating swimming pools and ventilating attics.

The main purpose of the disclosed attic heat recovery system is to substantially lengthen the swimming season for a pool at a minimal operating cost. Ideally, one would like to make the swimming season coincide with the time span of comfortable ambient air temperatures (greater than 18.3° C. or 65° F.). Beyond this period, when the weather is cool enough to warrant wearing long sleeves and/or a jacket, people are unlikely to be interested in swimming in an outdoor pool. A reasonable range for defining a comfort zone for swimming pool water is about 25.6 to 32.2° C. (78 to 90° F.). The temperature range of 25.6 to 27.8° C. (78 to 82° F.) perhaps could be described more accurately as tolerable rather than comfortable because it usually entails an initial chill when entering pool followed by a brief period of getting accustomed to the water temperature. Accordingly, higher temperatures of 28.3 to 32.2° C. (83 to 90° F.) are much more pleasing because little or no initial chill is experienced.

The disclosed system is inherently less costly than solar panels due to a more efficient use of material since the large insolation surface is provided by an existing roof surface 24. In contrast to a fixed solar collector, the roof of a house is likely to have some substantial portion of its surface in direct sunshine during almost the whole course of a day. In this manner, an attic heat recovery device can exploit morning sun as well as afternoon.

In contrast to an air-to-water heat exchanger mounted within an attic, the heat recovery device disclosed is much more forgiving to install. If it were to leak, the only result would be water running down the roof 24 or exterior wall 20 which would cause no damage to the house. Accordingly, the skill level required for installation is within capabilities of a substantial fraction of home owners. If no heating of the swimming pool 26 water is needed, the attic heat recovery system can still reduce the temperature in the attic 22 without overheating the pool 26 simply by shutting-off the water to the heat exchanger 28 while still allowing the fan 30 to keep running. Furthermore, the air exiting the heat exchanger 28 generally can not take a short path to the inlet of the heat exchanger 28. Soffit vents 34, which allow air to enter the attic, are typically placed at regular intervals around the periphery of the roof on the underside of the overhang.

The capital cost of the disclosed pool heating system is likely to be competitive with other pool heating systems on the market. Some indication of the price of a production heat recovery unit can be derived from a comparison with indoor hydronic (steam or hot water) heaters, which contain similar main components: a heat exchanger and a blower. An 11.6 kW (40,000 BTU/hr) capacity hydronic heater costs as little as $600.

Although the performance is comparable, the disclosed system and the SolarAttic system actually belong to separate classes of thermodynamic systems. If the system boundary is considered to be an imaginary box encompassing both a house and its swimming pool 26, then the SolarAttic system is a closed thermodynamic system in the sense that it does not significantly exchange mass with the environment (there is some actual mass exchange due to evaporation, rain and make-up water). In contrast, the disclosed system is an open thermodynamic system in that air from the surroundings crosses the system boundary to be drawn into the attic space 22 and crosses the system boundary again when it is discharged into the surroundings. For the closed system that recirculates attic air, the amount of heat in the form of incident solar radiation on a roof surface 24 is bounded quantity because there is a fixed amount of roof surface area to receive it. In contrast, for the case of the ambient air being warmer than the pool water, an open system can exploit the heat of the air from the surroundings which is a nearly boundless reservoir. The mass of warm air would normally extend for a great many miles along the earth's surface. For an unusual condition of having very still outside air, a recirculation pattern will develop around the outside of a house where the air leaving the attic finds its way back to an attic inlet 34. However, it would not take much of a breeze to disrupt such a recirculation pattern so that fresh warm air is continually flowing toward a house from some other part of its neighborhood.

One of the main strategies at work for the disclosed pool heating system is to increase the heat transfer rate to the pool 26 when weather conditions are favorable for warming the pool 26, and to minimize the heat transfer when the surroundings are cooler. Sunny skies and high ambient air temperatures generally coincide, but the apparatus is still effective when only one of these conditions is met. In fact, some pool warming would be possible just with a fan 30 and an air-to-water heat exchanger 28 out in the ambient air provided that the timing of air and water movement coincided with the hot part of the day.

For the most part, the attic heat recovery system described here is compatible if not complementary to other methods of warming a swimming pool 26. A "bubble wrap" pool surface cover would have a completely additive effect if used in conjunction with the disclosed apparatus. Since most roofs 24 are several times larger in area than the rule-of-thumb solar panel size requirement for whatever pool 26 that is on the property, the apparatus may be used in conjunction with solar panels with only a minor degradation of its output capacity. Accordingly, conventional solar collectors mounted on the roof 24 would still tend to create a net boost in the heat input to the pool 26. Glazed solar collectors would be preferable because they generate more heat per unit area. The attic heat recovery system presented here would not be compatible with a fan-coil unit mounted within the attic space 22.

A pool heating system comprising a pool 26 of liquid to be heated, a building structure having an interior and an exterior, the interior including attic space 22 subject to solar heating, the attic space 22 in communication with the exterior of the building space through an opening 32, an air-to-liquid heat exchanger 28 outside of the building structure such that heated air exiting the attic space 22 through the opening 32 passes through the heat exchanger 28 and positioned adjacent the opening 32 such that any liquid leaking from the heat exchanger 28 will not enter the opening 32 into the interior of the building structure, a liquid pump 40 for moving liquid from the pool 26 through the heat exchanger 28, a first conduit 38 between the pump 40 and the heat exchanger 28, a second conduit 38 between the heat exchanger 28 and the pool 26, and the first and second conduits 38 being attached to the exterior of the building structure and not entering the interior of the building structure such that any liquid that leaks from the conduit 38 is on the exterior of the building structure and may not pass to the interior.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
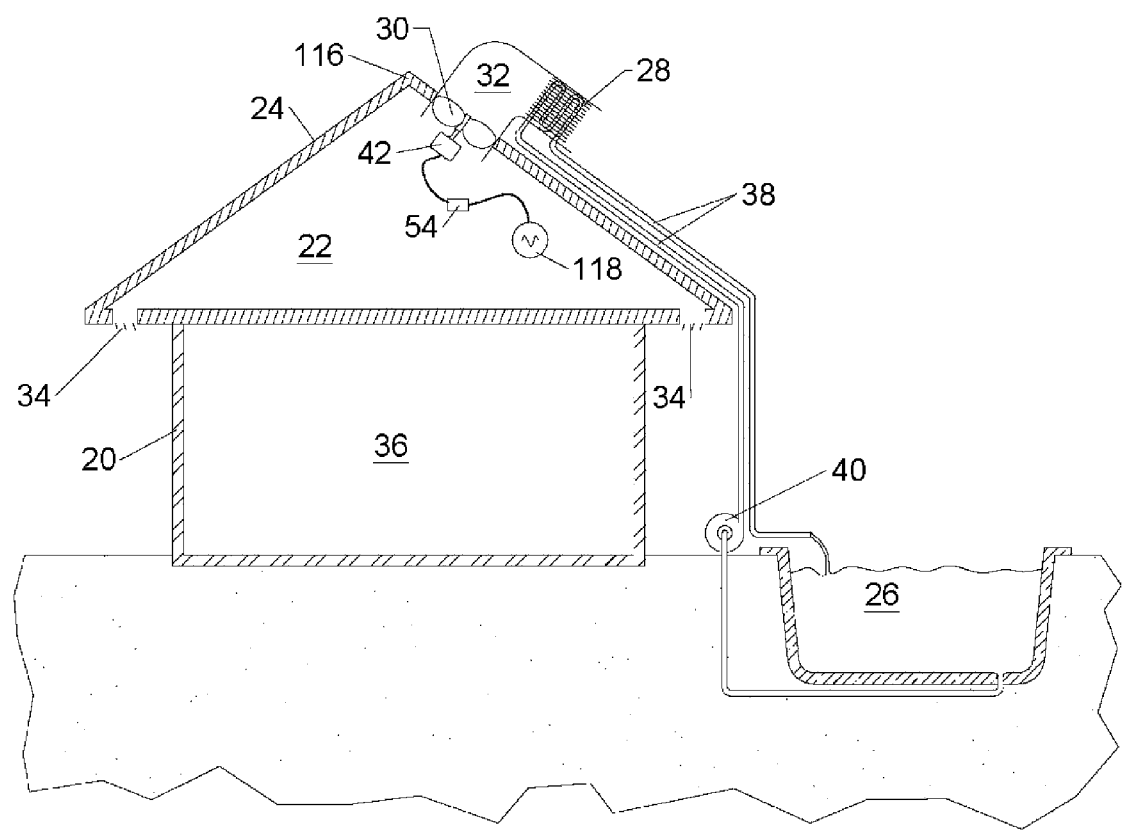
FIG. 1 illustrates a simplified schematic of a basic system according to one embodiment of the present disclosure.

The attic ventilation and heat recovery system of FIG. 1 is a dual-function apparatus that extracts undesirable heat from an attic space 22 by means of ventilation with the added capability of recovering this heat with a heat exchanger 28 for the purpose of warming a swimming pool 26. The device consists of a heat exchanger 28 mounted on the exterior of a residence with a fan or blower 30 to induce air movement through the heat exchanger 28. The primary source of attic space heat is from insolation of the roof surface 24. The features common to all embodiments are an air passage 32 from an attic space 22 to outside air, a fan or blower 30 to induce air movement in this passage 32, an air-to-water heat exchanger 28 and a temperature-sensing control device 54. Water supply and return tubes 38 or hoses are connected to the heat exchanger 28. Swimming pool water is driven through the passages within the heat exchanger 28 by the main pool pump 40 or an independent pump 72 dedicated to the heat exchanger loop. The fan or blower 30 consists of a fan or impeller 84 mounted on the shaft of a motor 42. The motor 42 is connected to a source of power 118. The power to the motor 42 is controlled by a temperature sensing device 54 such as a thermostat. The motor 42 is supported by a frame 88. The motor frame 88 is either attached directly to the house or to a base 90 which is attached to the house. The heat exchanger 28 may be placed upstream or downstream of the fan or blower 30. The heat exchanger 28 is attached to the motor frame 88 or base 90. If needed, a weather excluding cover 86 is used to keep rain and other precipitation out of the attic space 22. The cover 86 is also attached to the base 90.

The basic operating principles may be described in reference to the simplified drawing shown in FIG. 1. First of all, sunshine warms the roof surface 24 of a house. Much of this heat is transferred into the attic space 22. When the attic temperature exceeds a set threshold, a motor 42 is turned-on to spin a fan or blower impeller 30 to extract hot air from the attic space 22. If the swimming pool 26 needs to be warmed, then an air-to-water heat exchanger 28 takes the heat from the air extracted from the attic space 22 and transfers it to the swimming pool water. A pump 40 is used to circulate swimming pool water through the heat exchanger 28. The temperature of the attic space 22 is moderated by the entry of cooler outside air which is drawn-in through attic inlets 34 by the low pressure created by the blower 30. The embodiment shown in FIGS. 2 and 3 has two heat exchangers 28 that correspond to two existing attic fans 30 for an existing house.

Figure 2:
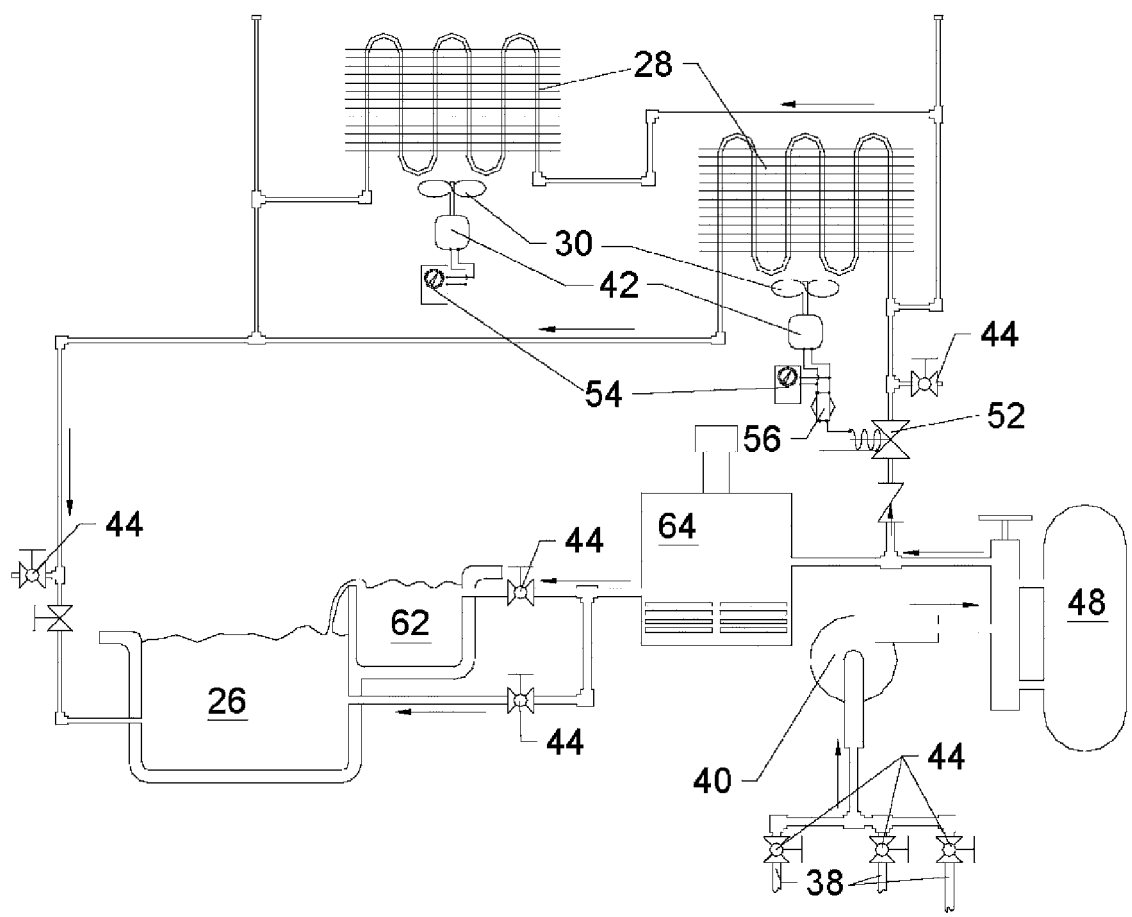
FIG. 2 illustrates a schematic of a plumbing configuration of a system according to one embodiment of the present disclosure that relies on the main pool pump.

FIG. 2 is a schematic of the plumbing and control configuration. The system may be operated with a very rudimentary control set-up as shown in FIG. 2. A 24-V transformer 56 may be connected in parallel with an existing fan motor 42 at a thermostatic switch 54. The 24-V secondary side of the transformer 56 is connected to the coil of a solenoid-actuated valve 52. When the thermostatic switch 54 turns-on the fan motor 42, the 24-V transformer 56 is also powered which energizes the solenoid valve 52 to make it open and allow water flow to the heat exchangers 28. The attic fan thermostat switch 54 may be set for 32.2° C. (90° F.) to ensure that the attic air temperature exceeds the swimming pool 26 water temperature. An existing timer switch for a pool filter pump 40 may be adjusted to have the pump 40 running to coincide with the time period when the attic fans 30 generally run. The discharge valves 44 to the pool 26 and spa 62 may be manually set to be partially closed to provide enough flow resistance to force an adequate flow through the heat exchanger loop.

Figure 3:
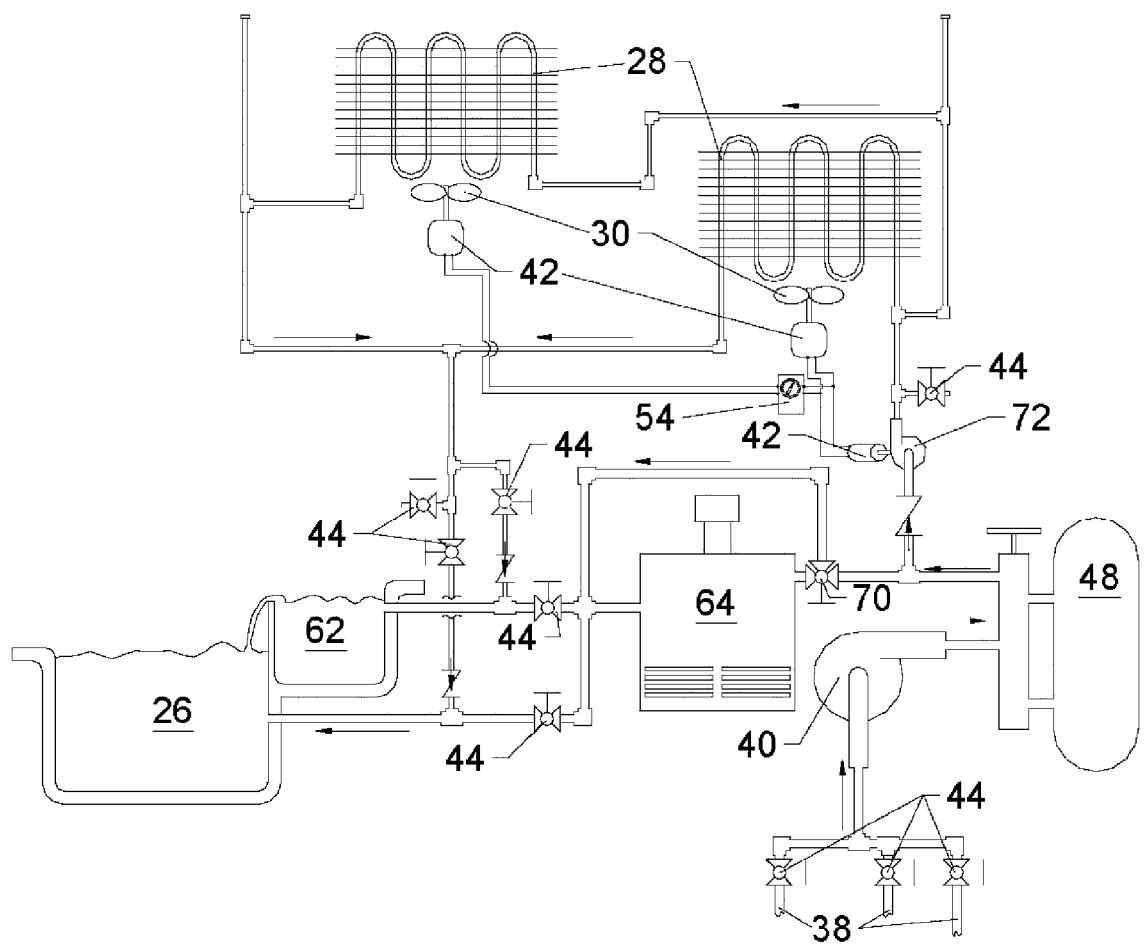
FIG. 3 illustrates a schematic of a plumbing configuration according to one embodiment of the present disclosure using a secondary pump.

An improvement over the above plumbing configuration is depicted in FIG. 3. One feature of this configuration addresses a shortcoming of the prototype system. This shortcoming is an excessive dissipation of the power output of the pump 40 caused by throttling the main discharge flow in order to achieve adequate flow through the heat exchanger loop. A better approach to achieving adequate flow is to install an auxiliary pump 72 in the heat exchanger loop so that no throttling of the primary flow would be needed. For most solar systems, the conventional approach is to use automatic power-actuated valves to divert flow through solar collectors. However, a small pump 72 is actually much less expensive than a $300 power-actuated valve. The original prototype system was improved by the installation of a $160, 50 Watt (1/15 HP) pump 72 in the manner shown in the schematic in FIG. 3. This modification allowed a 15 L/min flow to be obtained through the heat exchanger loop while the main pump 40 discharge valves 44 were fully open. An auxiliary pump 72 also provides a capability for the heat exchanger loop to work independently of the main pump 40 which primary function is to drive water through a filter 48 to keep the pool water clean. The auxiliary pump 72 would run when there is useful heat available in the attic 22 whereas the more powerful main pump 40 would only run as much as necessary to keep the pool 26 clean. Moreover, it would be advantageous for the consumer and/or the power distribution grid to set the timer control to run the main pump 40 during off-peak power demand times. It is also possible that a photovoltaic panel may be a practical means of powering the auxiliary pump 72 because the motor's 42 demand for power would coincide fairly well with the supply of photovoltaic power from sunshine. A 50 W photovoltaic panel presently costs $300 to $400. Similarly, photovoltaic panels could also power motors 42 for attic ventilation fans 30 or blowers. Photovoltaic-powered attic fans are currently on the market, but the air mass flow capabilities of these blowers are probably too low to be well suited for pool heating applications. The improved schematic also includes a flow bypass 70 of the fuel-burning heater 64 which would eliminate the flow resistance of this mostly idle appliance.

Figure 4:
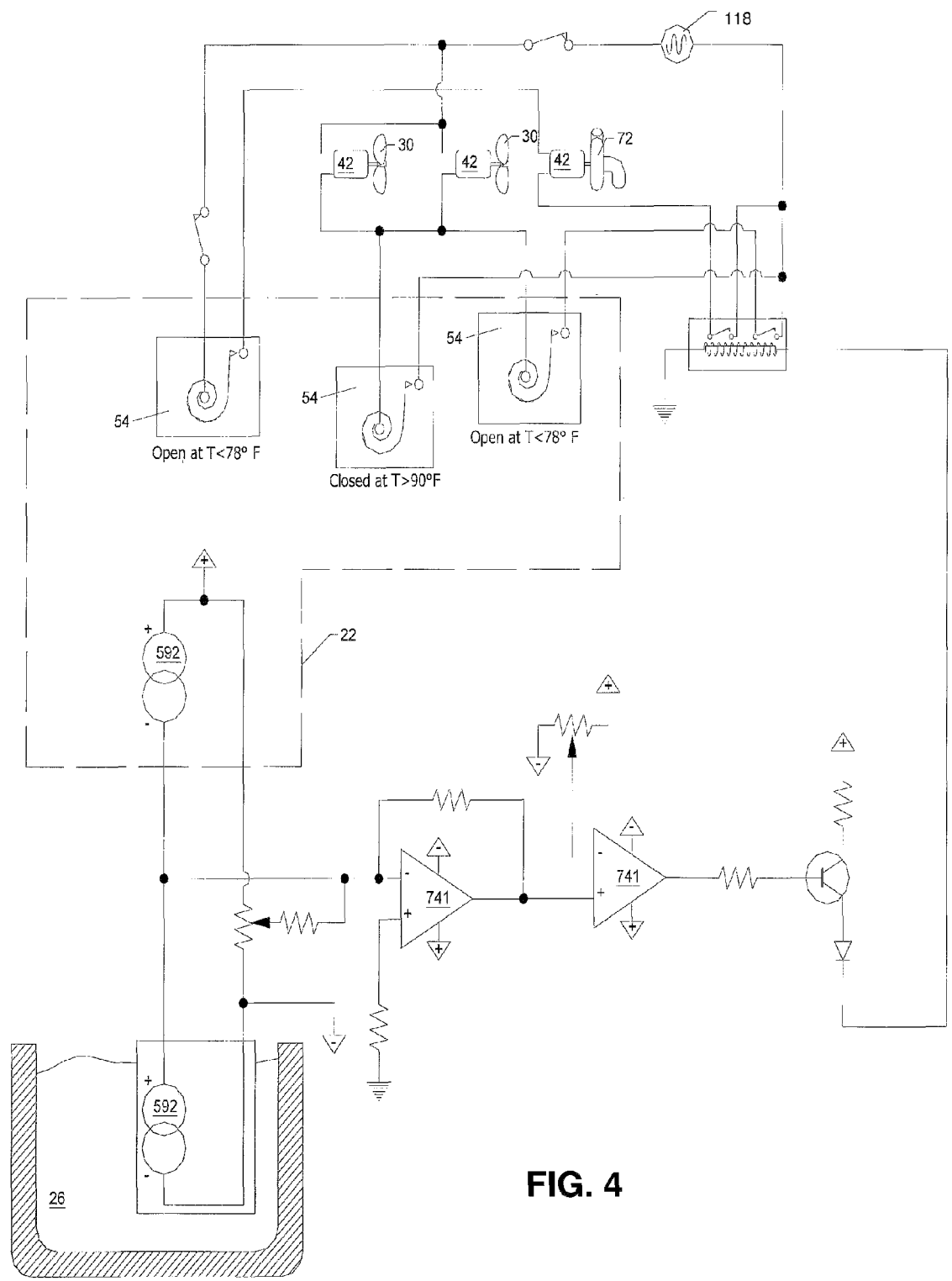
FIG. 4 is an example of a differential temperature sensing control circuit according to one embodiment of the present disclosure.

The method of control may also be improved over the simple attic thermostat switch 54 technique used for the prototype system. A more optimal control method would use a differential measurement of the attic air and the pool water temperatures as shown in FIG. 4. This kind of control would be particularly helpful during the springtime warm-up period. For example, if the pool temperature was 15.6° C. (60° F.) and the attic temperature was 26.7° C. (80° F.), a controller using a differential measurement would have the heat recovery system running to bring the pool temperature closer to the comfortable range. Although the bulk of the pool water would not be brought all the way to the comfortable temperature range, the amount of heat transferred to the pool 26 would be actually the same as for the case of the attic temperature being 37.8° C. (100° F.) and the pool temperature 26.7° C. (80° F.). The simple control set-up of the prototype system did not have the capability of automatically exploiting a springtime temperature differential such as that given in the example. However, this differential temperature control strategy should not be pursued too aggressively because if the attic 22 becomes cooler than the living space 36 then it may draw a significant amount heat from the living space 36. To prevent the attic heat recovery system from imposing a heating load on the living space 36, the system should be automatically disabled for attic temperatures less than 25.6° C. (78° F.). If there is no such automatic minimum attic temperature cut-off and there is natural draft combustion equipment within the attic space 22 then an interlock would be required to prevent the possibility of combustion exhaust fumes being pulled into the attic 22 by the heat recovery system rather than exiting through an exhaust vent. For this case, the interlock would disable the attic heat recovery system whenever the natural draft combustion appliance was commanded to operate by its thermostat. A differential temperature measurement can be accomplished through a variety of established techniques. It is simple to set-up a thermocouple circuit to make a differential temperature measurement. However, integrated circuit chip sensors 592 (such as the Analog Devices AD592) or resistive thermal devices (RTD) offer significant advantages over thermocouples because of the superior strength and clarity of the output signals. FIG. 4 shows an example of a control circuit that uses AD592 chips 592 to compare the attic 22 and pool 26 temperatures. In addition, the circuit contains temperature-sensitive electromechanical switches 54 to monitor the attic temperature in order to disable the heat recovery system if the attic temperature is below 78° F. An additional temperature-sensitive electromechanical switch 54 is present to turn-on the attic fans 30 independently of the differential temperature circuit to provide ventilation when pool heating is not required. This example circuit could be made at a low cost because AD592 chips 592 are only $2, operational amps 741 are only $0.35, and temperature-sensitive switches 54 are about $6. Alternatively, a different controller from the circuit suggested in the example could make an analog or digital comparison of two separate measurements (as opposed to a combined signal) and make the appropriate command to the heat recovery system. For ease of installation, a wireless transmission of the pool temperature signal could be incorporated into the control system.

If an attic heat recovery system incorporates variable speed motors then an even more sophisticated controller could automatically tailor the mass flows of both air and water to optimize the systems performance according to the operating conditions. Electric motor technology is advancing to bring the cost of variable speed motors much closer to that of single speed motors 42. Variable speed blowers are now affordable enough to be used in high efficiency residential heating and cooling systems. Moreover, variable speed pool pumps are now being marketed for the advantages of greater efficiency and less noise. If the temperature difference between the attic 22 and the pool 26 is small, the controller could increase the mass flow of air and water through the heat exchanger 28 to increase the heat transfer rate. This action would increase the heat output rate at the expense of increased power consumption of the blower and pump motors 42. Alternatively, if there is a substantial temperature difference, the pump and blower motors 42 could be run at optimal speeds to minimize their electricity consumption. Having a variable mass flow capability would make the most out of an open system's ability to draw heat from the air surrounding a house.

The above-described system is not limited to outdoor residential swimming pools 26. The system is scalable to commercial swimming pools and can equally be applied to indoor swimming pools or above ground swimming pools. The only limitations on applicability are the solar loading of the structure being used to gather heat from. For instance, it has been found that if the roof area substantially exceeds the pool surface area the system will be more successful.

A variety of heat recovery unit configurations may be considered in order to best suit the characteristics of a particular building. The main consideration is the selection of a practical location for access to the attic space 22 air that also minimizes any detraction from the aesthetics of the building exterior.

Figure 5:
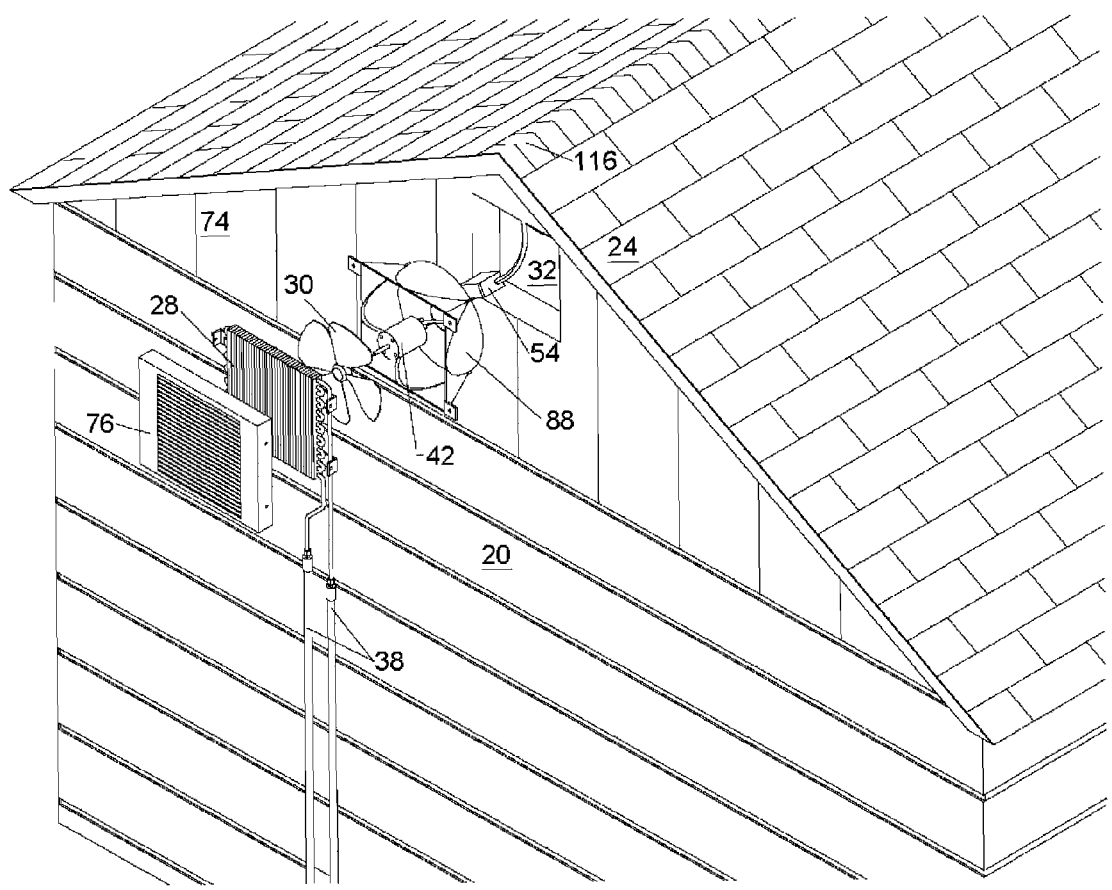
FIG. 5 is an exploded view of a gable installation according to one embodiment of the present disclosure.
Figure 6:
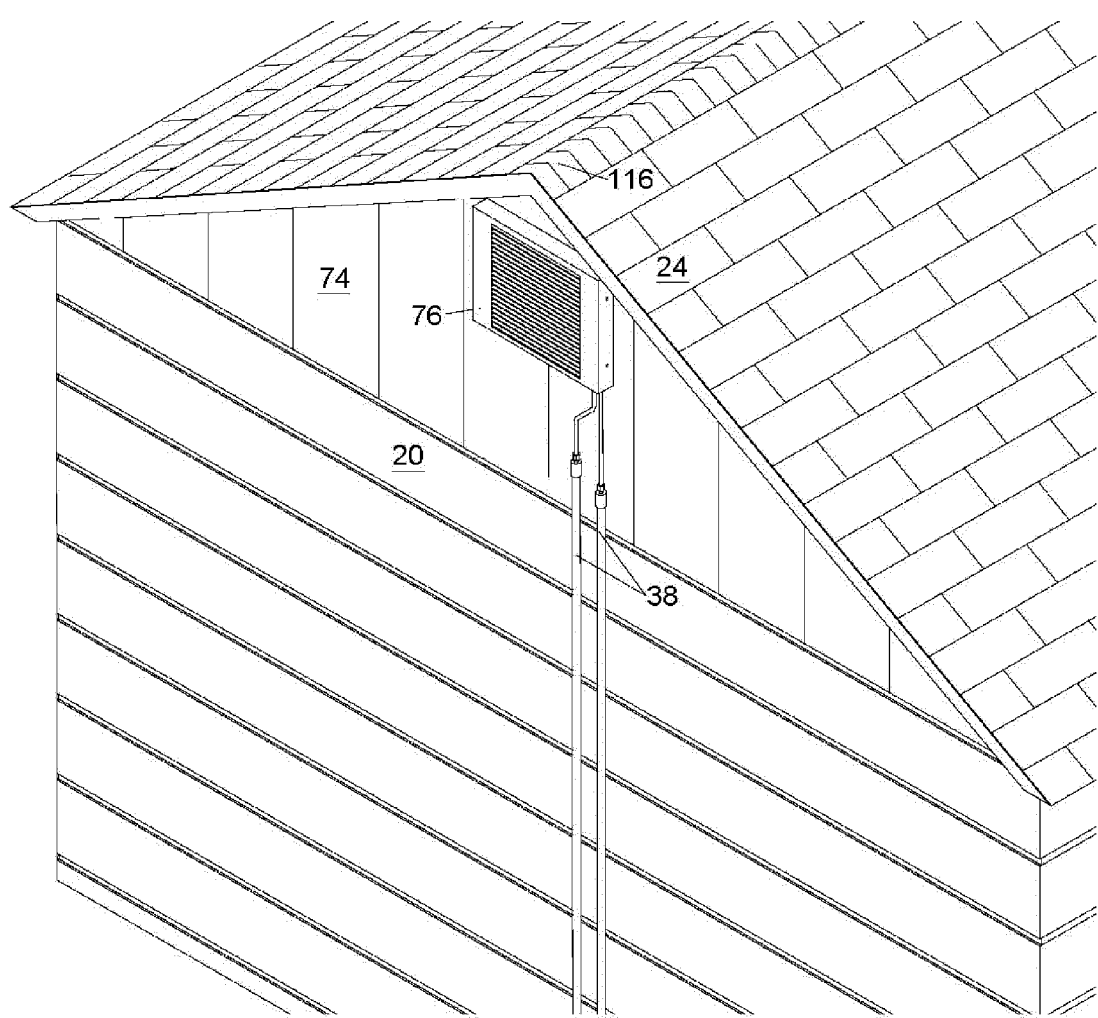
FIG. 6 is an assembled view of a gable installation according to one embodiment of the present disclosure.

If a house features gables 74 (FIGS. 5 and 6), then a very sensible location for the heat recovery unit would be near the peak of a gable 74. Moreover, for a minimal visual impact, a flat heat exchanger 28 could be mounted against an opening 32 on the outside surface of the gable 74 with a fan 30 hidden just inside the attic space 22. With the heat exchanger 28 in this position, any leak would likely only wet the house exterior 20. A vented panel 76 on the outside of the unit would keep rain out of the attic 22 and could be painted to match the exterior 20 of the house.

Figure 7:
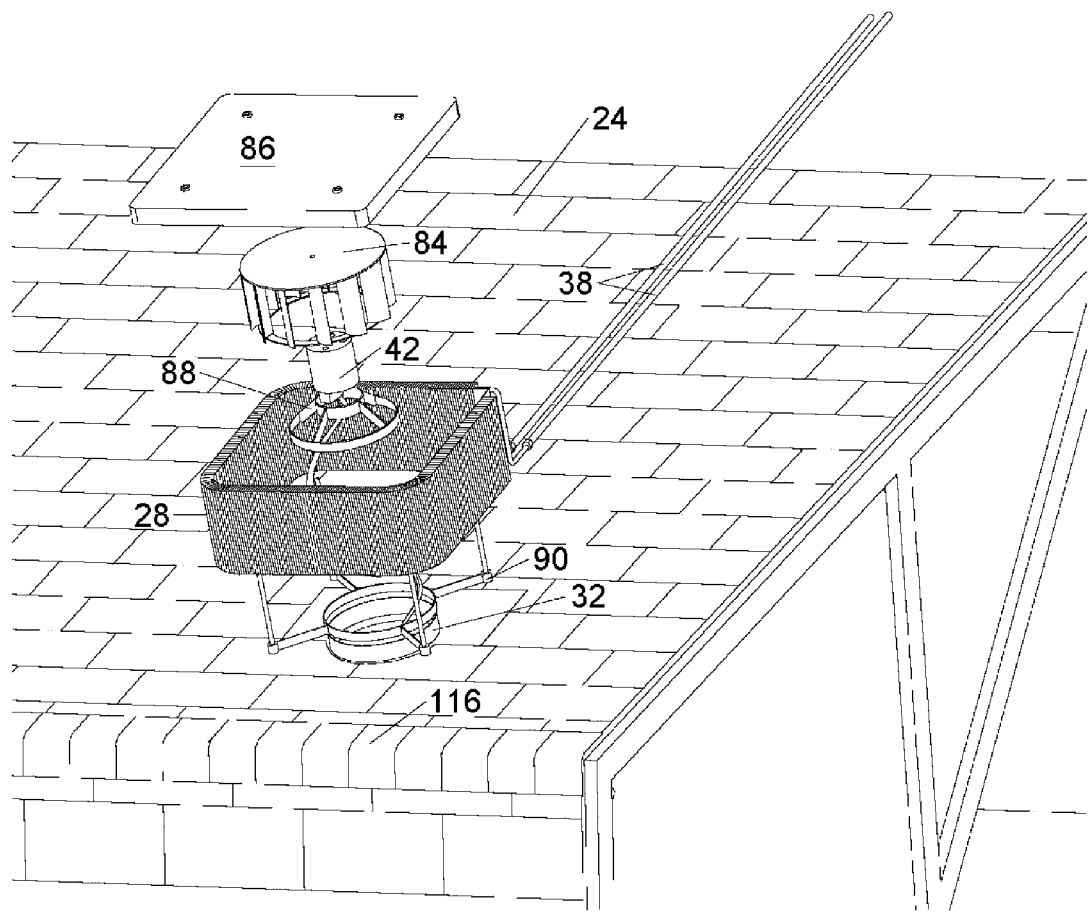
FIG. 7 is an exploded view of a rooftop installation according to one embodiment of the present disclosure.
Figure 8:
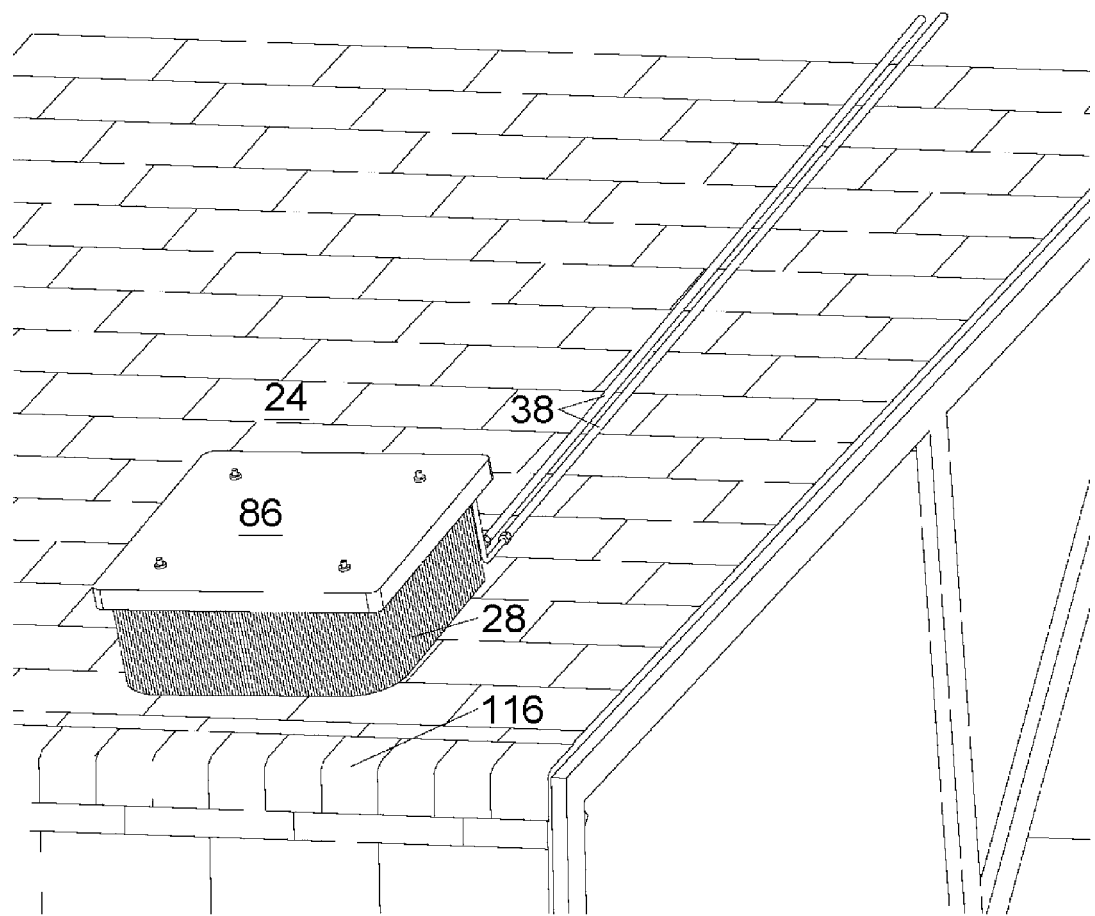
FIG. 8 is an assembled view of a rooftop installation according to one embodiment of the present disclosure.

For the case of a house having roof vents 106, the best approach may be to retrofit a heat recovery unit onto an existing roof opening 32. For a roof installation (FIGS. 7 and 8), a unit with a heat exchanger coil 28 shaped to surround a blower impeller 84 would be implemented to produce a compact design. With the coil in this shape, no flow directing housing would be required to enclose the blower impeller 84. A centrifugal impeller 84 would turn the airflow at a right angle to the inlet making turning vanes unnecessary. A weather excluding cover 86 goes over the top of the unit. For this configuration, any water leaks would tend to run harmlessly down the roof 24. The same concealment practices could be applied to roof-mounted heat recovery units as are used for conventional attic vents 106. Passive and powered roof vents 106 are usually placed near the peak 116 of a roof on the side facing away from the street. This placement mostly hides the vent 106 from the view of the neighbors. Furthermore, the vents 106 are often painted to match the color of the roof 24. Even if a heat recovery unit was placed in plain sight, a short, nondescript cylinder projecting from a roof surface 24 would still present less of an eyesore than other commonly tolerated roof projections such as satellite antennae. The water lines 38 connecting the roof-mounted heat recovery unit may be painted to blend visually with the roof surface 24.

Figure 9:
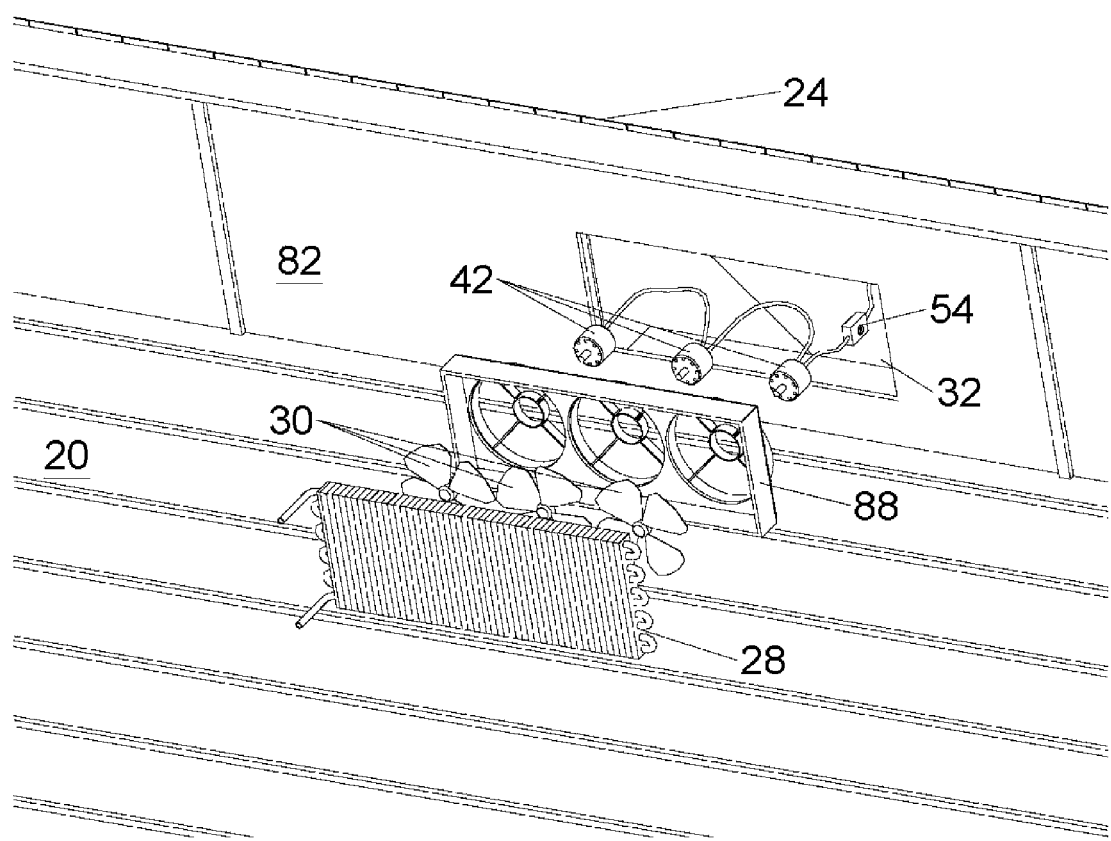
FIG. 9 is an exploded view of a soffit installation looking up from below the soffit according to one embodiment of the present disclosure.
Figure 10:
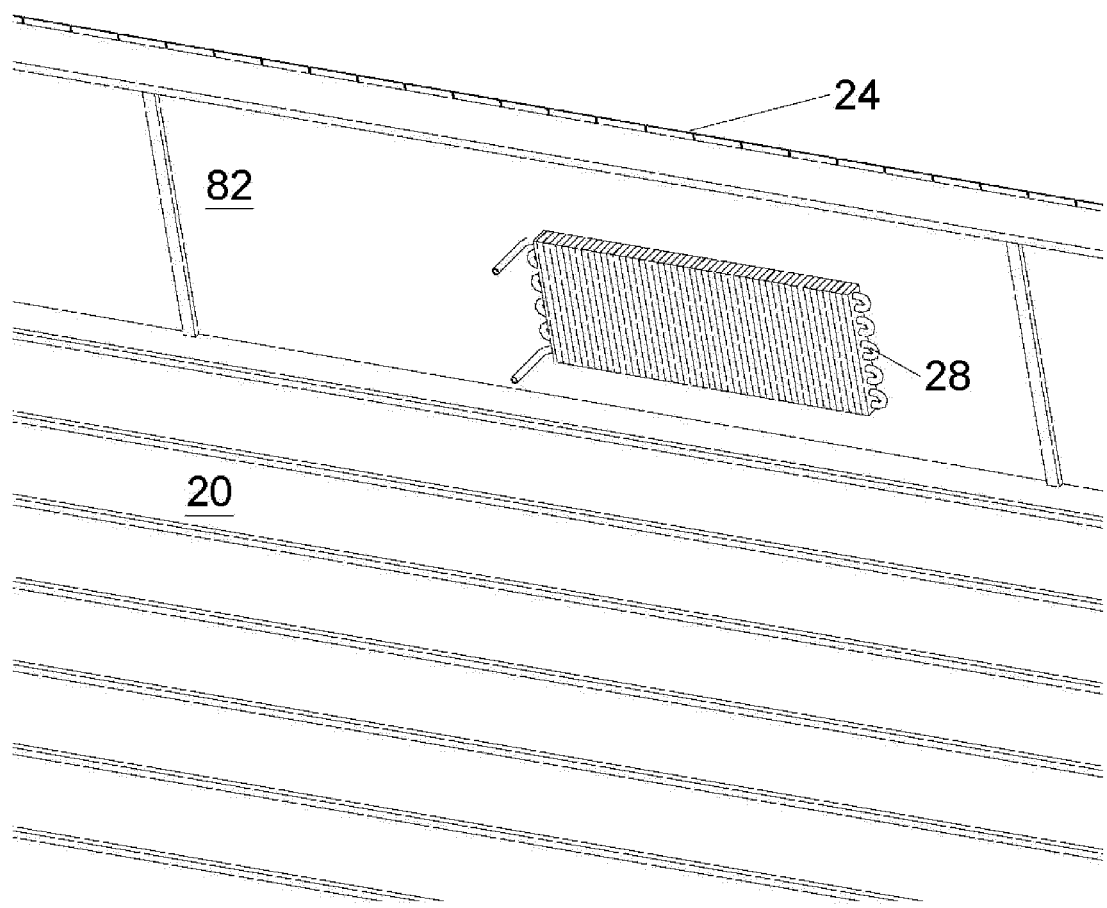
FIG. 10 is an assembled view of a soffit installation looking up from below the soffit according to one embodiment of the present disclosure.
Figure 11:
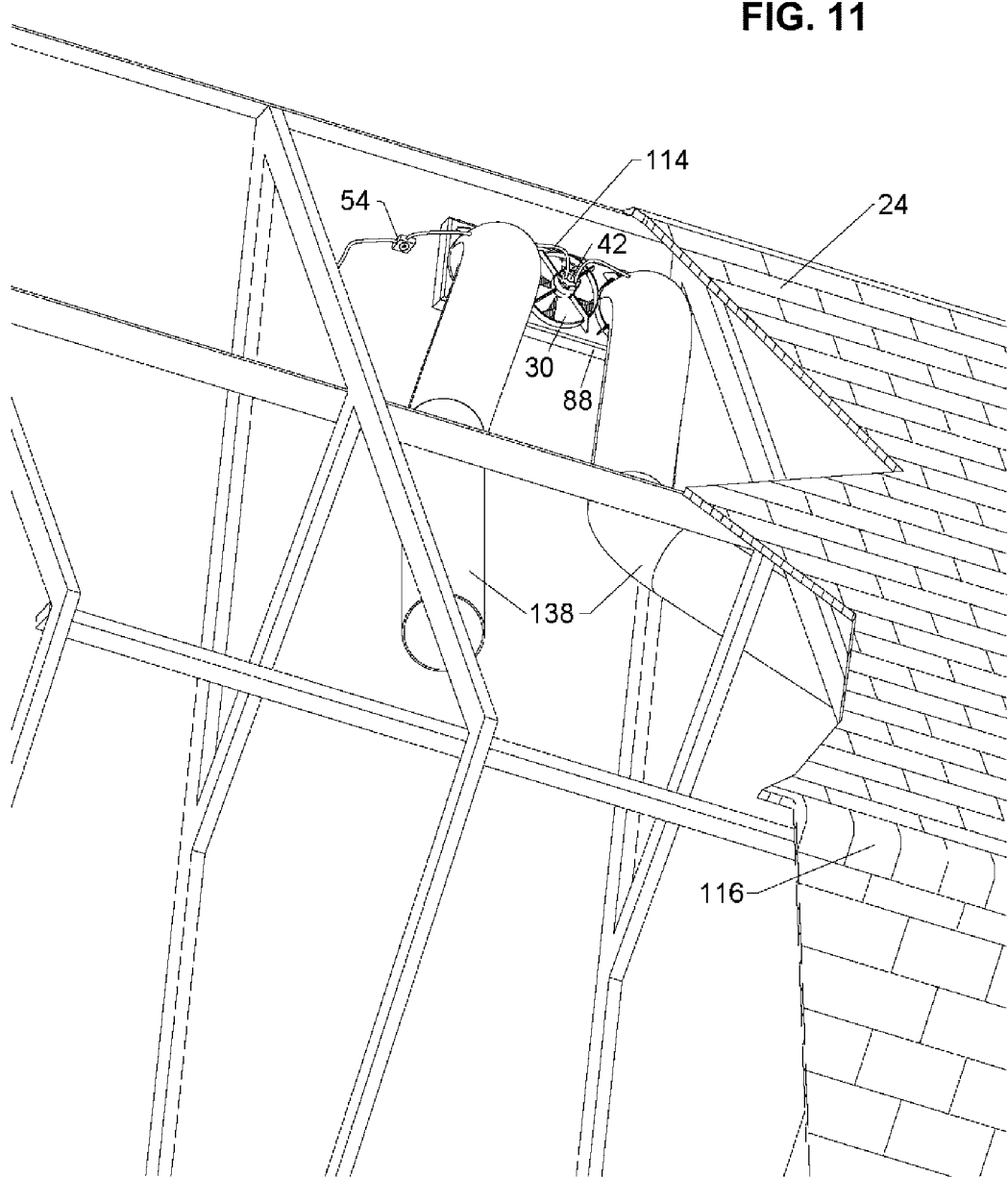
FIG. 11 illustrates a roof cutaway view of a soffit installation showing ducts connected to a unit within the attic space according to one embodiment of the present disclosure.
Figure 12:
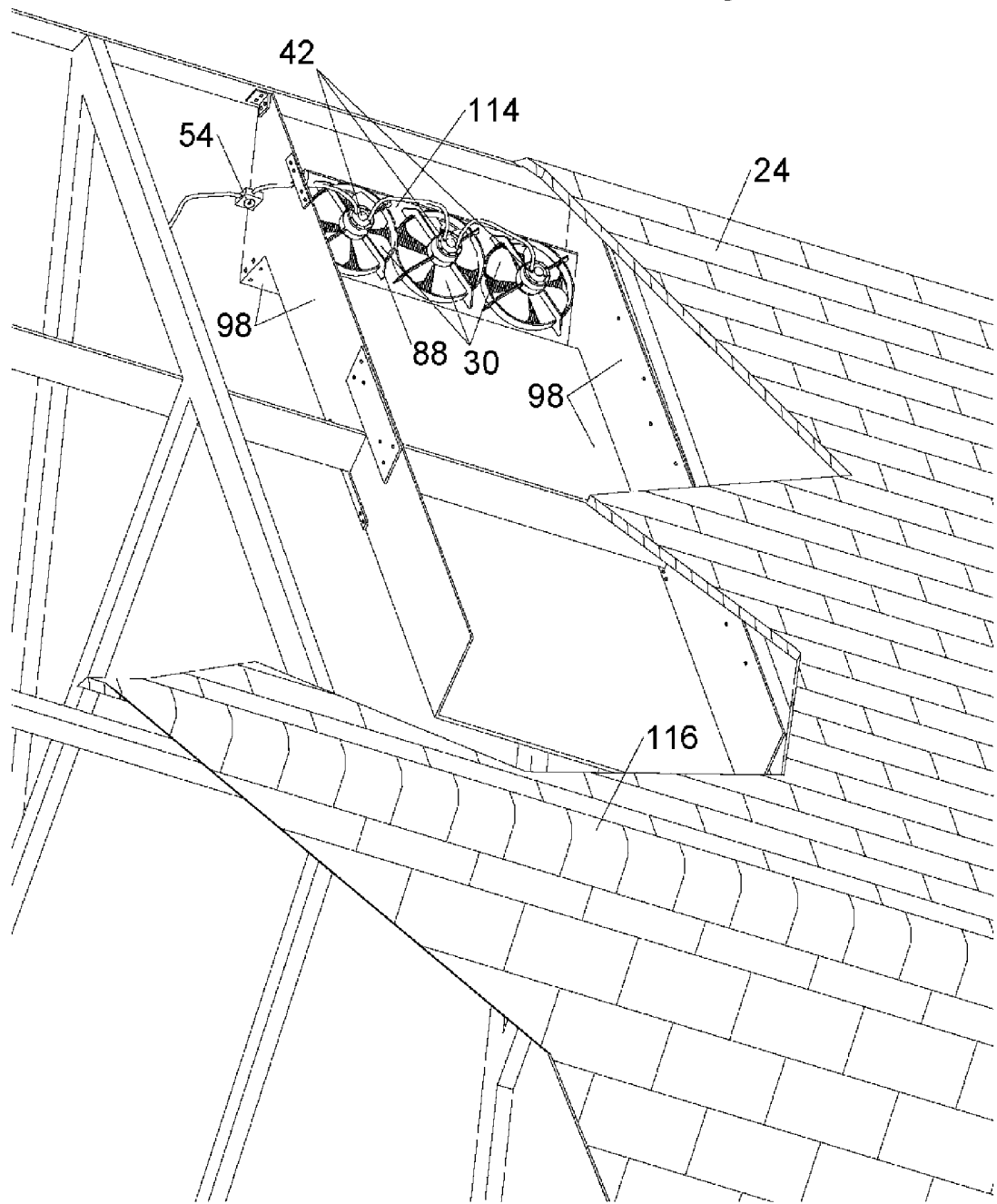
FIG. 12 illustrates a roof cutaway view of a soffit installation showing assembled partition panels to confine a flow path from the upper portion of an attic according to one embodiment of the present disclosure.
Figure 13:
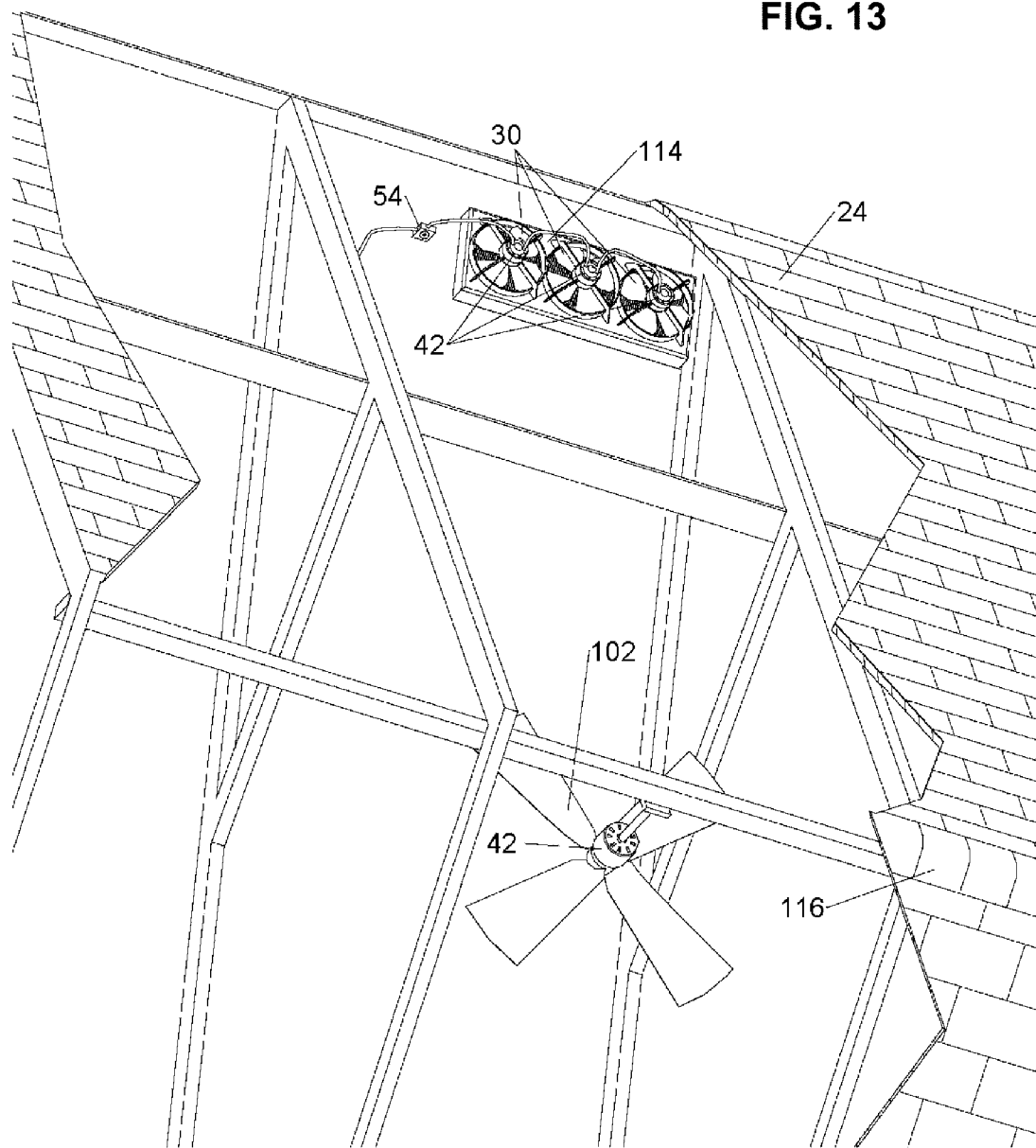
FIG. 13 illustrates a roof cutaway view of a soffit installation showing a mixing fan within the attic space to counteract thermal stratification within the attic space according to one embodiment of the present disclosure.

If a house features roof overhangs of sufficient length from the exterior wall 20, then a heat recovery unit could be placed on a soffit 82 (the underside of an overhang) (FIGS. 9 and 10). The soffit 82 location is very accessible, well concealed, and would tend to permit much shorter water lines 38 than a roof installation. A factor potentially counteracting the effectiveness of this installation option is the natural tendency for temperature stratification within an attic 22. Due to buoyancy, less dense hot air tends to rise and collect in the high spaces in the attic 22. Accordingly, a fan 30 mounted on the soffit 82 may tend to draw-out the cooler air in the lower attic 22 and not significantly extract the hottest air at the top. However, there are some ways to overcome this potential difficulty. First of all, a sufficiently powerful heat exchanger fan 30 (in terms of suction and volume) could overwhelm the effects of thermally induced buoyancy. A different approach is to install inlet ducts 138 in the attic 22 to connect the fans 30 to the higher reaches of an attic 22 (FIG. 11). If the attic space 22 adjacent to the overhang is too tight to install a duct 138, then an alternative approach (FIG. 12) would be to install partitions 98 inside the attic 22 to effectively form an inlet duct to the fans 30 from a high point in the attic 22. A solution using a more active approach would be to install a secondary fan 102 within the attic space 22 to stir the air and break-up the stratification (FIG. 13). Any attic inlets 34 in close proximity to the heat recovery unit would need to be blocked to prevent a short air recirculation pattern from forming.

Figure 14:
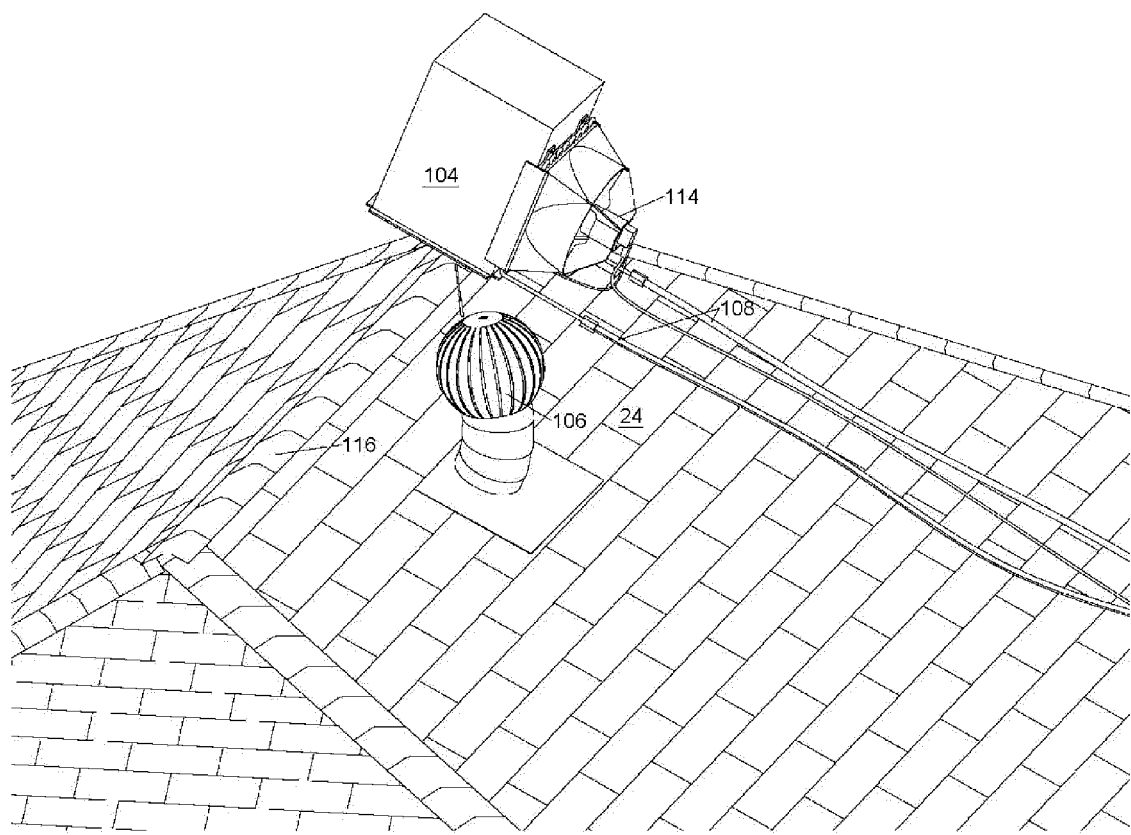
FIG. 14 illustrates a demonstration unit in a position to be lowered over an existing roof vent according to one embodiment of the present disclosure.
Figure 15:
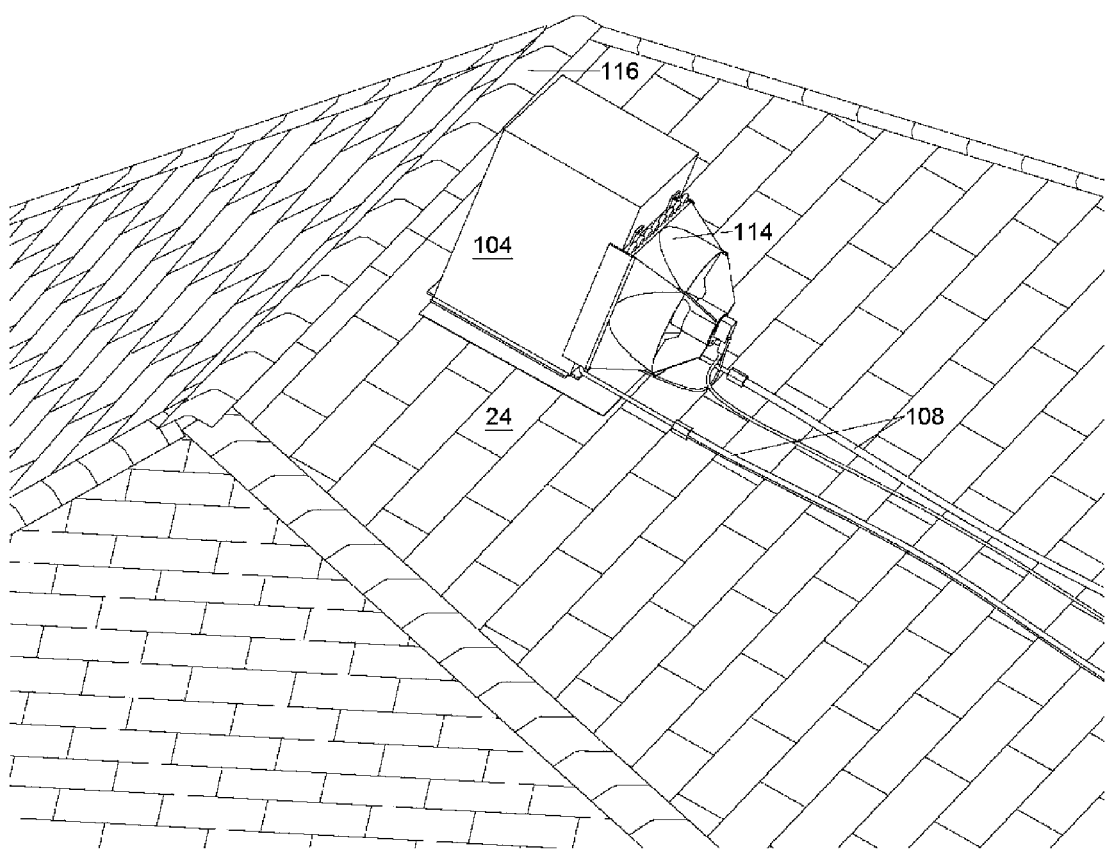
FIG. 15 illustrates a demonstration unit enclosing an existing roof vent according to one embodiment of the present disclosure.

If a house has an existing opening 106 to the attic space 22 then it is possible that a demonstration unit could temporarily be installed for sales purposes (FIGS. 14 and 15). Thus the effectiveness of the system could be proven for the particular conditions of the customer's property. An existing roof vent 106 could be enclosed within a hood 104 leading to the suction side of a fan/coil assembly 114 of a demonstration unit. A heat exchanger 26 could be located either upstream or downstream of the blower 30. Demonstration units for a gable 74 or soffit 82 attic openings 32 would be much more similar in configuration to the permanent heat recovery units for such locations. A demonstration unit would have its own portable pump 72 and use flexible hoses 108 to extract and return water to the pool 26.

Water may be circulated though the heat exchanger 28 either by the main pool pump 40 or an auxiliary pump 72. If the main pool pump 40 is used to circulate water through the heat exchanger 28, then an automatic power actuated valve would be necessary for convenient operation. An auxiliary pump 72 will usually be less expensive than automatically actuated valves.

Sophisticated controls may be used to maximize the performance and convenience of the machine. However the device is still effective with manual or rudimentary automatic controls.

The coils 28 described above are not limited to coils 28 having a circular cross section or circular coil shape. Further, in some applications multiple coils 28 may be advantageous.

The terms fan and blower 30 are used herein to mean any devices that move air 30, as such many commonly known fans or blowers 30 would be appropriate.

It is understood that the heat exchanger 28 may be on either the discharge or suction side of any fan or blower 30.

The above-described system may be installed as complete apparatus or modification kit to exploit existing ventilation fan 30 and/or attic opening 32.

Blower 30 and heat exchanger 28 may be widely spaced if connected by an air conduit 138. Blower 30 may be located inside or outside the attic space 22.

Electric power 118 from the utility grid is the most conventional manner of powering the blower 30, but other means could be used such as photovoltaic power or a Stirling cycle engine. Even the energy in the flowing water may be used to power the blower 30.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A pool heating system comprising:
a pool of liquid to be heated;
a building structure having an interior and an exterior with a roof having a slope forming a boundary between the interior and the exterior, the interior including attic space subject to solar heating, the attic space in communication with the exterior of the building structure through an opening;
the roof forming an overhang around the periphery of the building structure, the overhang having a soffit;
a plurality of air inlets in the soffit of the overhang in communication with the attic space;
an air-to-liquid heat exchanger on the building structure exterior such that heated air exiting the attic space through the opening passes through the heat exchanger and positioned adjacent to and down the slope from the opening or laterally spaced apart from the opening, such that any liquid leaking from the heat exchanger will not enter the opening into the interior of the building structure;
a liquid pump for moving liquid from the pool through the heat exchanger;
a first conduit between the pump and the heat exchanger;
a second conduit between the heat exchanger and the pool; and
the first and second conduits feeing attached to the exterior of the building structure and not entering the interior of the building structure such that any liquid that leaks from the conduit is on the exterior of the building structure and may not pass to the interior.

2. The pool heating system of claim 1 further comprising: a fan to move heated air from the attic through the heat exchanger.

3. The pool heating system of claim 2 wherein: the fan is positioned between the opening and the heat exchanger.

4. The pool heating system of claim 2 wherein: the fan is positioned in the opening.

5. The pool heating system of claim 2 wherein: the fan is upstream of the heat exchanger.

6. The pool heating system of claim 2 wherein: the fan is downstream of the heat exchanger.

7. The pool heating system of claim 2 further comprising: a second fan within the attic space to mix heated air within the attic space.

8. The pool heating system of claim 1 further comprising: a duct in the attic space that directs heated air from the attic space towards the opening.

9. The pool heating system of claim 8 further comprising: a fan associated with the duct to direct the heated air towards the opening.

10. The pool heating system of claim 8 further comprising: a fan at one end of the duct to direct the heated air towards the opening.

11. The pool heating system of claim 8 further comprising: a fan at each end of the duct to direct the heated air towards the opening.

12. The pool heating system of claim 8 further comprising: a fan within the duct to direct the heated air towards the opening.

13. The pool heating system of claim 1 further comprising:
an air temperature sensor in the attic to measure the air temperature within the attic space and send an air temperature signal based on that measurement;
a water temperature sensor in communication with the pool to measure the liquid temperature in the pool and send a water temperature signal based on that measurement;
a control system that reads the air temperature signal and the water temperature signal and determines whether the pump should be active or inactive based on preset parameters, the control system activating or deactivating the pump based on the determination.

14. The pool heating system of claim 13 wherein: the water temperature sensor is within the pool.

15. The pool heating system of claim 13 wherein: the water temperature sensor is within the skimmer of the pool.

16. The pool heating system of claim 2 further comprising:
- an air temperature sensor in the attic to measure the air temperature within the attic space and send an air temperature signal based on that measurement;
- a water temperature sensor in communication with the pool to measure the liquid temperature in the pool and send a water temperature signal based on that measurement;
- a control system that reads the air temperature signal and the water temperature signal and determines whether the pump should be active or inactive based on preset parameters, the control system activating or deactivating the pump based on the determination.

17. The pool heating system of claim 16 wherein: the water temperature sensor is within the pool.

18. The pool heating system of claim 16 wherein: the water temperature sensor is within the skimmer of the pool.

19. The pool heating system of claim 1 wherein: the heat exchanger is mounted to a vertical gable surface on the exterior of the structure.

20. The pool heating system of claim 1 wherein: the heat exchanger is coupled to the roof of the building structure and the opening is such that any liquid flow on the roof will not flow into the opening.

21. The pool heating system of claim 1 wherein: the pump is a pool main pump.

22. The pool heating system of claim 1 wherein: the pump is an auxiliary pump separate from a pool main pump.

23. The pool heating system of claim 1 wherein: the heat exchanger is coupled to the roof of the building structure and surrounds the opening such that any liquid leaking from the heat exchanger will not enter the opening into the interior of the building structure.

* * * * *